United States Patent Office 2,945,300
Patented July 19, 1960

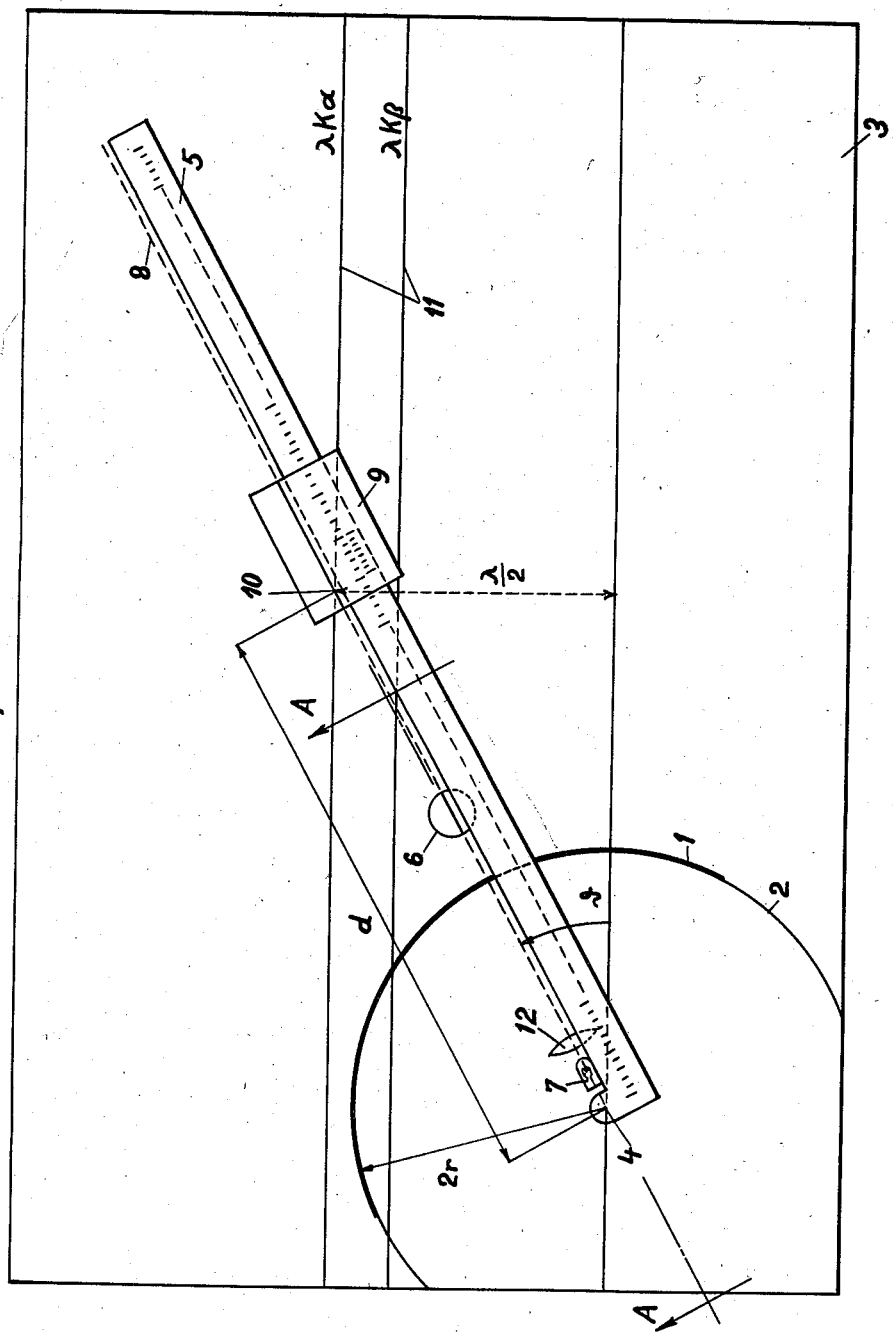

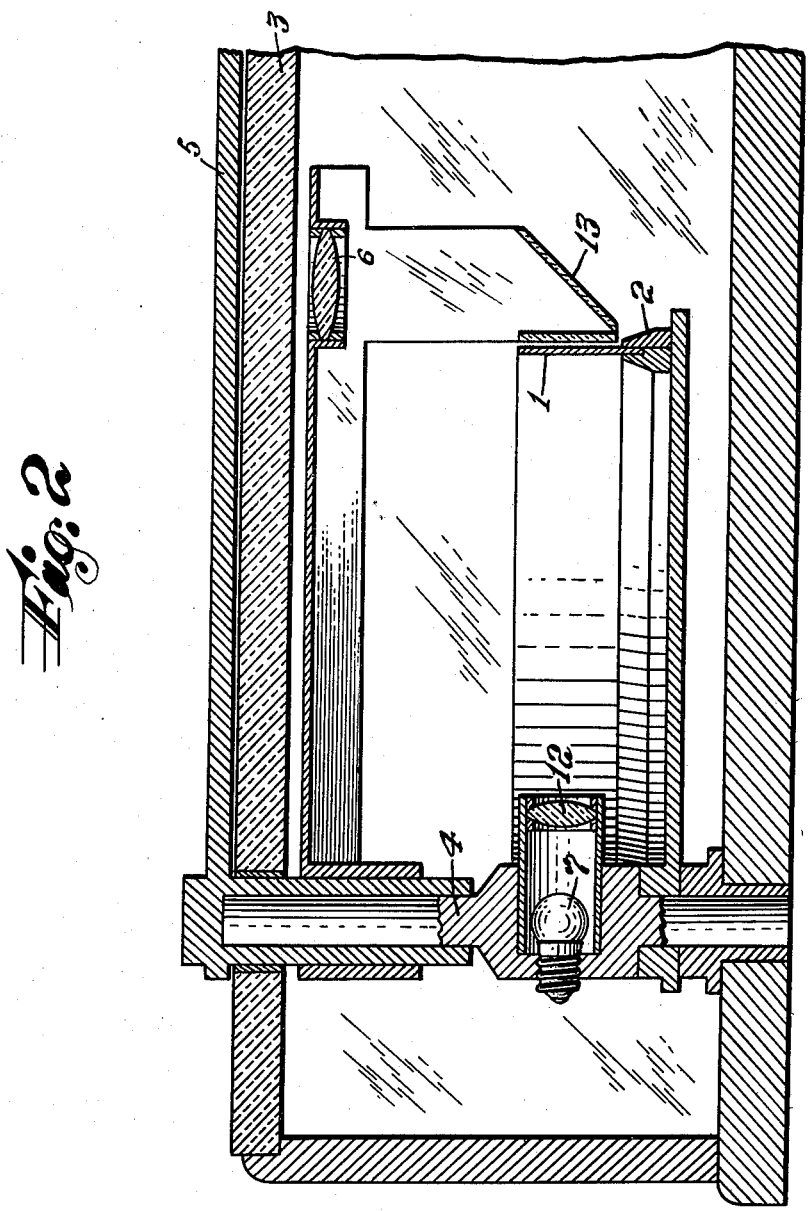

2,945,300

APPARATUS FOR THE EVALUATION OF X-RAY PHOTOGRAPHS

František Khol, 834 Benesova, Lysa n/Labem, Czechoslovakia, and Jaroslav Talaš, 4 Karlovo nam., Prague II, Czechoslovakia Filed Apr. 4, 1957, Ser. No. 650,589

Claims priority, application Czechoslovakia Apr. 12, 1956

1 Claim. (Cl. 33—1)

This invention relates to apparatus for the rapid evaluation of X-ray photographs of the fine structure of matter, more particularly of Debye-Scherrer photographs, wherein each diffraction line indicates a certain constituent of the substance under investigation.

The identification of structural constituents and individual elements in alloys and of minerals present in ores and rocks is achieved by interpretation of the diffraction patterns obtained from the characteristic X-radiation passing through the lattice planes of the substance being investigated. The interpretation of the diffraction rings appearing in the Debye-Scherrer photographs is carried out by measuring accurately the angles $\delta$ of the individual lines by means of a comparator and by calculating the corresponding lattice parameters $d$ from Bragg's equation $$\sin \delta = \frac{\lambda}{2d}, \quad d = \frac{\lambda}{2 \sin \delta}$$

for the wavelength $\lambda$ of the characteristic X-radiation employed.

Charts have already been published (such as, for example, Data for X-ray Analysis, volume I, 1953, Philips Technical Library) from which it is possible to find out the respective lattice parameter $d$ corresponding to the angle $\delta$ which can be measured in the diffraction pattern, obtained by a given X-radiation characterised by the wavelength $\lambda$.

If the lattice parameters $d$ are determined for each diffraction line of the same pattern, it is possible to identify the constituents of the sample under investigation, for example, by using the card index issued by the American Society for Testing Materials, the American Society for X-ray and Electron Diffraction and the British Institute of Physics, wherein the parameters $d$ for various substances are given so as to enable the unknown substance to be found and identified for each parameter $d$ derived from the diffraction pattern.

The calculation of the lattice parameters $d$ of the unknown constituents in the substances under examination from the angles $\delta$ measured in the diffraction patterns and substituted in Bragg's equation $$d = \frac{\lambda}{2 \sin \delta}$$

is time-wasting and requires well-trained personnel having advanced education.

It is therefore the object of the present invention to provide an apparatus which enables one to obtain a rapid and simple determination of the lattice parameters $d$ corresponding to the diffraction lines in the X-ray photographs.

The invention may be understood from the following description of an illustrative embodiment which is to be read in connection with the accompanying drawings, wherein:

Fig. 1 is a diagrammatic top plan view of an apparatus embodying the invention; and Fig. 2 is a vertical sectional view of the apparatus taken along the line A—A of Fig. 1.

Referring to the drawings in detail, it will be seen that the X-ray photograph 1 is introduced into the transparent chamber, having a transparent cylindrical side wall 2 against which the photograph is placed, and the chamber is provided with an illuminating lamp 7 and is so designed that the image forms a cylindrical surface having a radius equal to the diameter of the X-ray diffraction camera used for taking the photograph under investigation. The cylindrical wall 2 is arranged in one corner of a box having a top wall formed by a transparent measuring plate 3. Coincident with the axis of the cylindrical surface formed by the photograph adhering to the cylindrical wall 2 of the chamber there is a rotary pivot 4 to which a flat rule 5 is attached so as to lie upon the top surface of the measuring plate 3 and be frictionally held by the latter in any angularly adjusted position. The body of the rule 5 is laterally offset with respect to its turning axis and is calibrated with a millimeter scale starting at the perpendicular to the scale of the rule 5 which passes through the turning axis. The light source or lamp 7, a condenser lens 12 for focusing the light from source 7, a mirror 13 and a sight 6 in the form of another condenser lens are all located with their centers on a straight line 8 passing through the turning axis and representing the virtual axis of the rule parallel to its body, with such line being traced on the condenser forming the sight 6. As shown in Fig. 2, the lamp or light source 7 and the focusing condenser lens 12 can be carried by the pivot 4, while the condenser lens of sight 6 which has its optical axis perpendicular to plate 3 and the mirror 13 are mounted on an arm which turns with rule 5 about the axis defined by pivot 4. A sliding member 9 encloses the rule and is provided with a nonius and a transparent plate. The member 9 can be shifted along the scale of rule 5.

The position of the line 8 and the extension of the zero mark of the nonius perpendicular to the line 8 are traced on the transparent plate attached to the sliding member 9 to provide a cross-mark; and the distance of the intersection point 10 from the turning axis depends on the position of the sliding member when shifted along the rule and can be read on the scale by means of the nonius.

A system of lines 11 parallel to the basic (zero) position of the rule are marked on the measuring plate 3. The distance of any of these parallel lines from the basic position of the virtual axis 8 of the rule represents one half of a definite wavelength $\lambda$ of the characteristic X-radiation employed for taking the photograph. The enlargement chosen is preferably of such an order that 1 centimeter of any distance on the measuring plate corresponds to the length of 1 Angstrom; therefore, the distance of any parallel line from the basic line in centimeters indicates one half of the appertaining wavelength in Angstroms.

On turning the rule 5, it is possible to observe in the lens 6 forming the sight the individual diffraction rings in the illuminated photograph inside the apparatus. If the rule is adjusted to such a position that the line of the sight 6 coincides with the diffraction line to be identified, the angular deviation of the rule from the basic line determines the angle $\delta$. By shifting the sliding member 9 along the rule to an adjusted position where the intersection point 10 lies on the line corresponding to the wavelength $\lambda$ of the X-radiation employed, it is possible to read directly on the rule the lattice parameter $d$ as the distance of the point 10 from the turning axis according to the equation $$d = \frac{\lambda}{2 \sin \delta}$$

The apparatus can be arranged so as to enable the interpretation of the X-ray photographs taken in cameras of different radii and by X-radiation of different wavelengths, usually by both the radiations $K_\alpha$ and $K_\beta$. A further advantage of such an arrangement consists in that it is possible to find out exactly for any diffraction line $K_\alpha$ the respective line $K_\beta$ merely by pivoting the rule, without shifting the slider. If the rule is so adjusted that the cross line of the sight coincides with the diffraction line $K_\alpha$ and the slider 9 is fixed in the position wherein the point 10 is on the line $\lambda_{K\alpha}$, the respective line $K_\beta$ can be found below the line of the sight 6, when the rule with the fixed slider is turned into such a position as to bring the point 10 onto the line $\lambda_{K\beta}$.

The nature and object of the present invention having thus been set forth and a specific embodiment of the same illustrated and described in detail, what is claimed as new and useful and desired to be protected by Letters Patent is:

An apparatus for the evaluation of X-ray photographs of the fine structure of matter, more particularly of Debye-Scherrer photographs, whereby the lattice parameter $d$ is determined for any diffraction ring with regard to the wavelength of the characteristic X-radiation employed for taking the photograph, comprising, in combination, a transparent cylindrical wall defining a chamber in which the photograph under investigation is inserted so as to be against the transparent cylindrical wall, the radius of said chamber equalling the diameter of the camera used for taking the photograph, a transparent measuring plate on the top of said chamber in a plane perpendicular to its axis, a rotary pivot arranged in the axis of said chamber, a rule attached to the upper end of said pivot and lying on the upper side of said measuring plate, said rule having a calibrated scale thereon, a lamp connected with said pivot and arranged so as to illuminate the photograph in a direction parallel to said rule, an arm attached to said pivot and extending parallel to said rule, a mirror arranged at the end of said arm outside said chamber in a position opposite said lamp so as to reflect the illuminated area of the photograph perpendicularly up to said measuring plate, a sight arranged in connection with the rule directly above said mirror and bearing a straight trace extending along a line which is parallel to the rule and intersects the axis of said pivot representing the virtual axis of the rule, a movable sliding member enclosing the rule so as to leave said scale visible, a transparent member attached to said sliding member and provided with a cross mark consisting of two mutually perpendicular lines which respectively indicate the virtual axis of the rule and extend across said sliding member as far as the scale, and a system of lines traced on the measuring plate parallel to the basic position of the virtual axis of the rule, the ratio of the distance of each of said lines from said basic position to one half of the corresponding wavelength of the X-radiation employed being equal to the ratio of the unit of the calibrated scale of the rule to 1 Angstrom.

References Cited in the file of this patent

UNITED STATES PATENTS

| 2,332,391 | McLachlan | Oct. 19, 1943 |
| 2,773,415 | Wolfe | Dec. 11, 1956 |
| 2,819,405 | Bond | Jan. 7, 1958 |

FOREIGN PATENTS

| 859,739 | France | Sept. 16, 1940 |
| 609,960 | Great Britain | Oct. 8, 1948 |